July 19, 1927.
C. D. BURNEY
1,636,354
MOORING MAST AND MOORING GEAR FOR LIGHTER-THAN-AIR AIRCRAFT
Filed Feb. 11, 1925
6 Sheets-Sheet 1
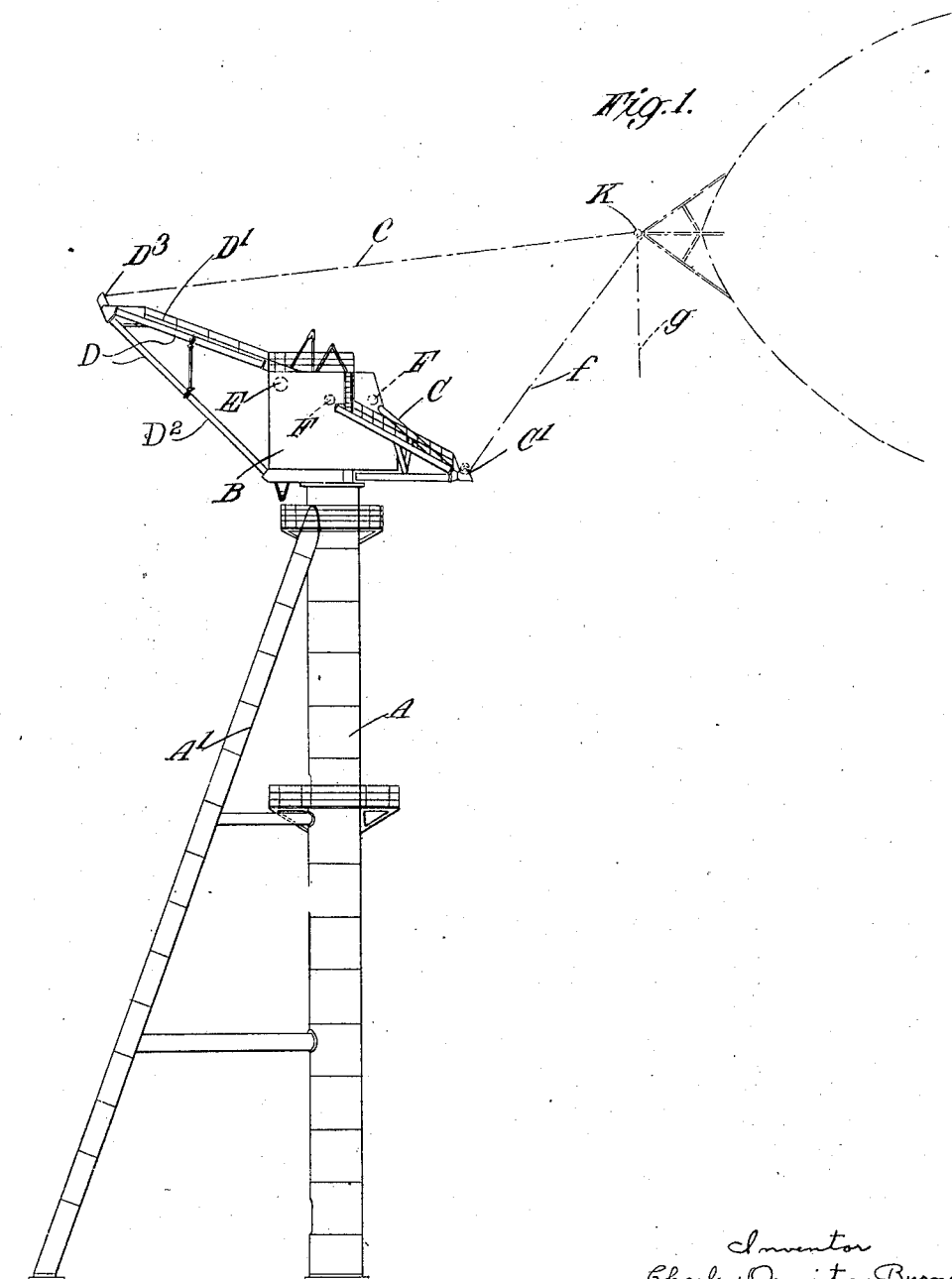

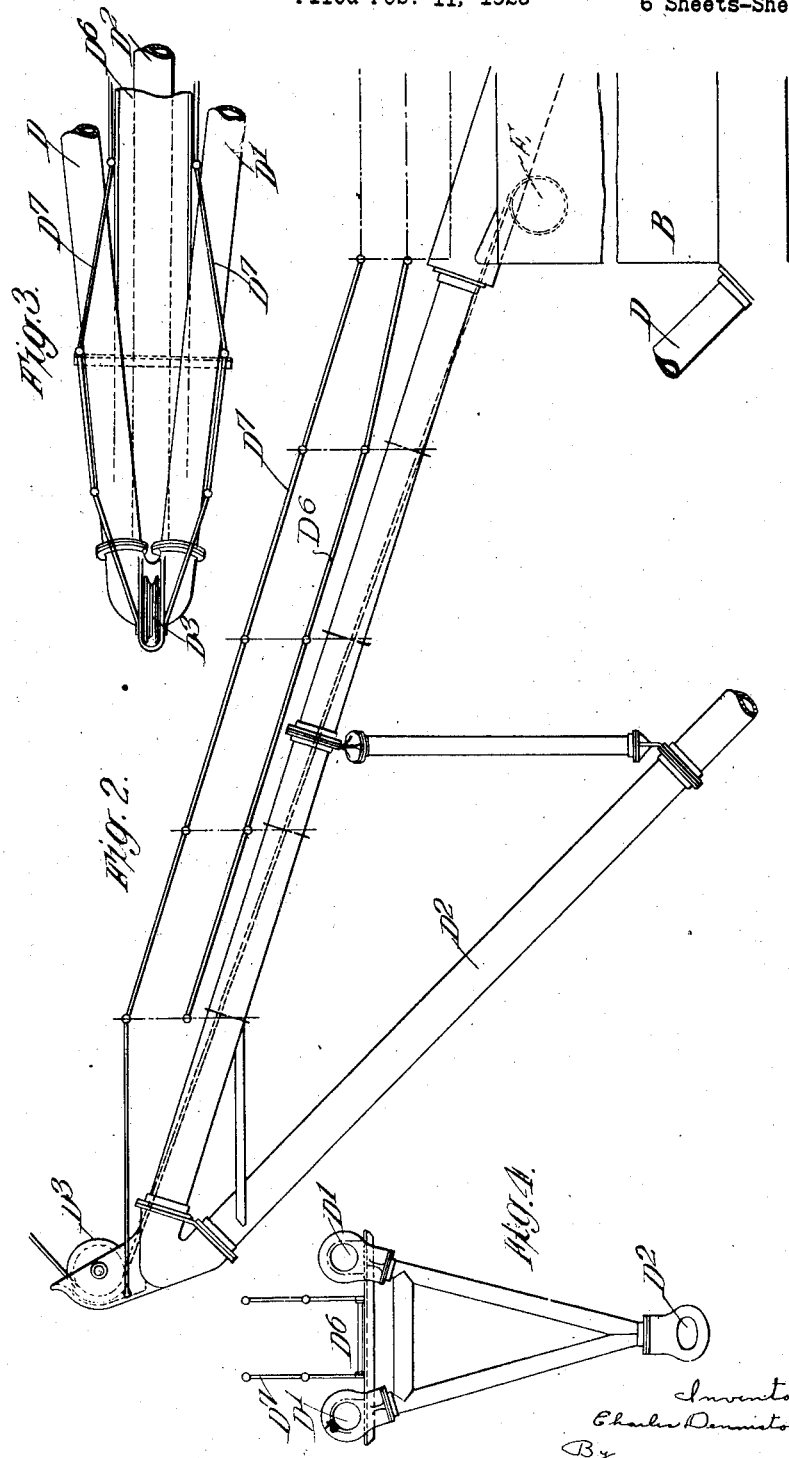

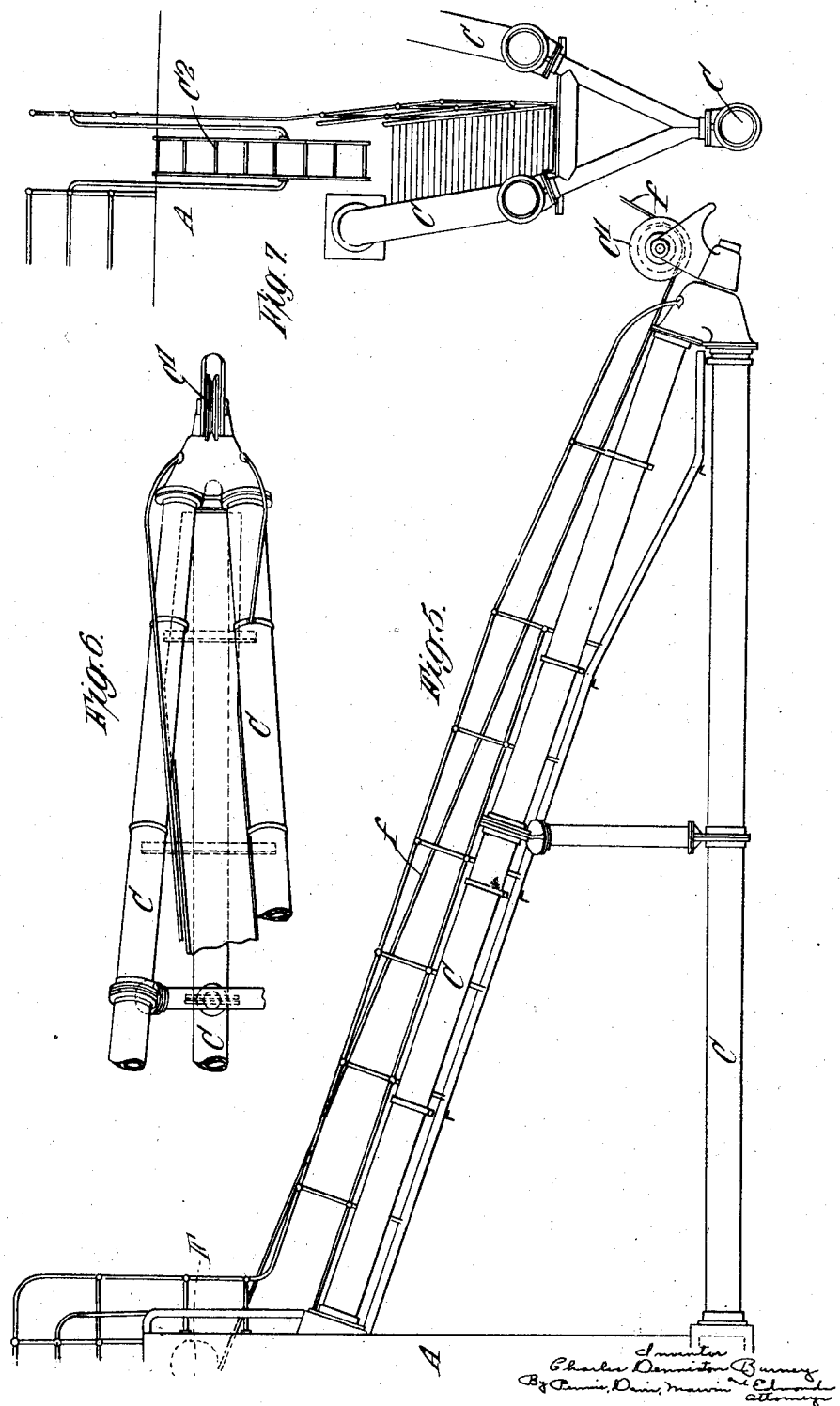

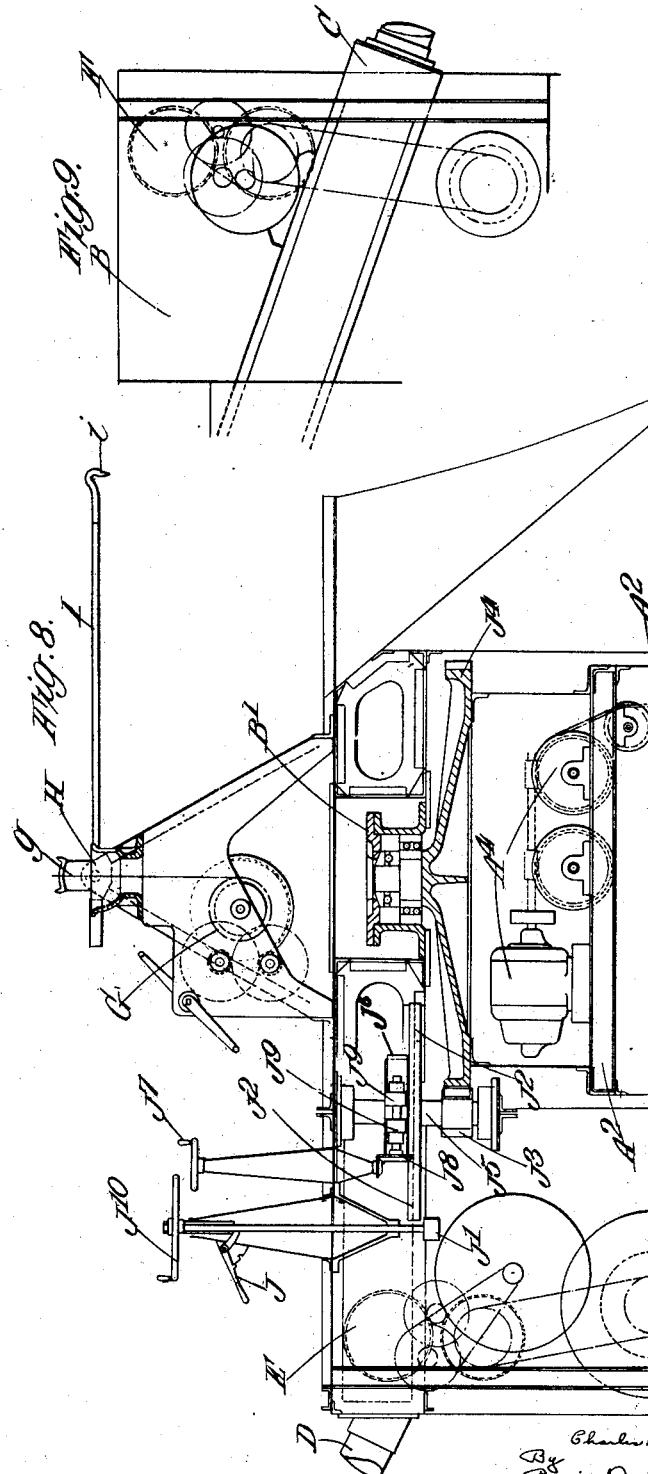

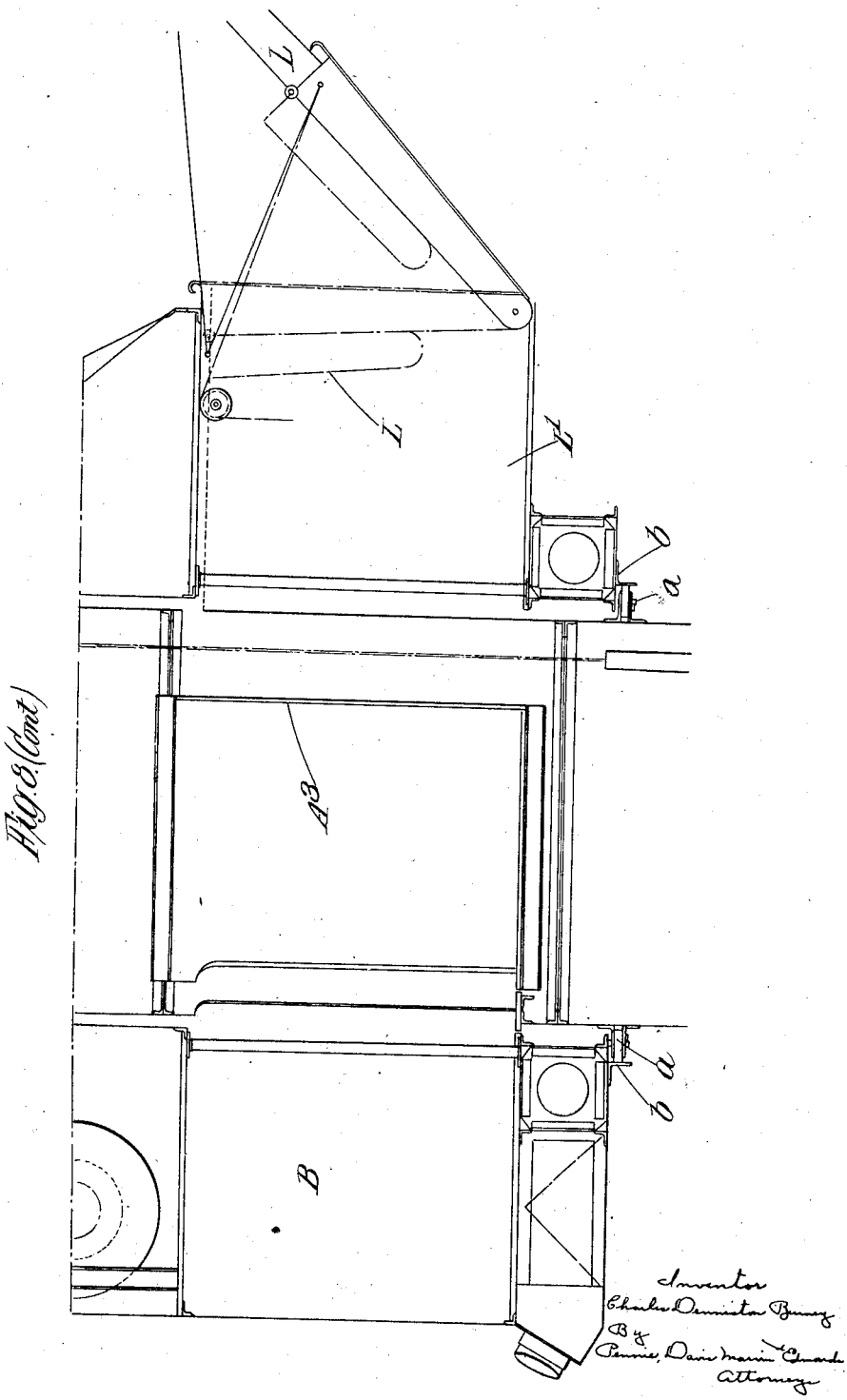

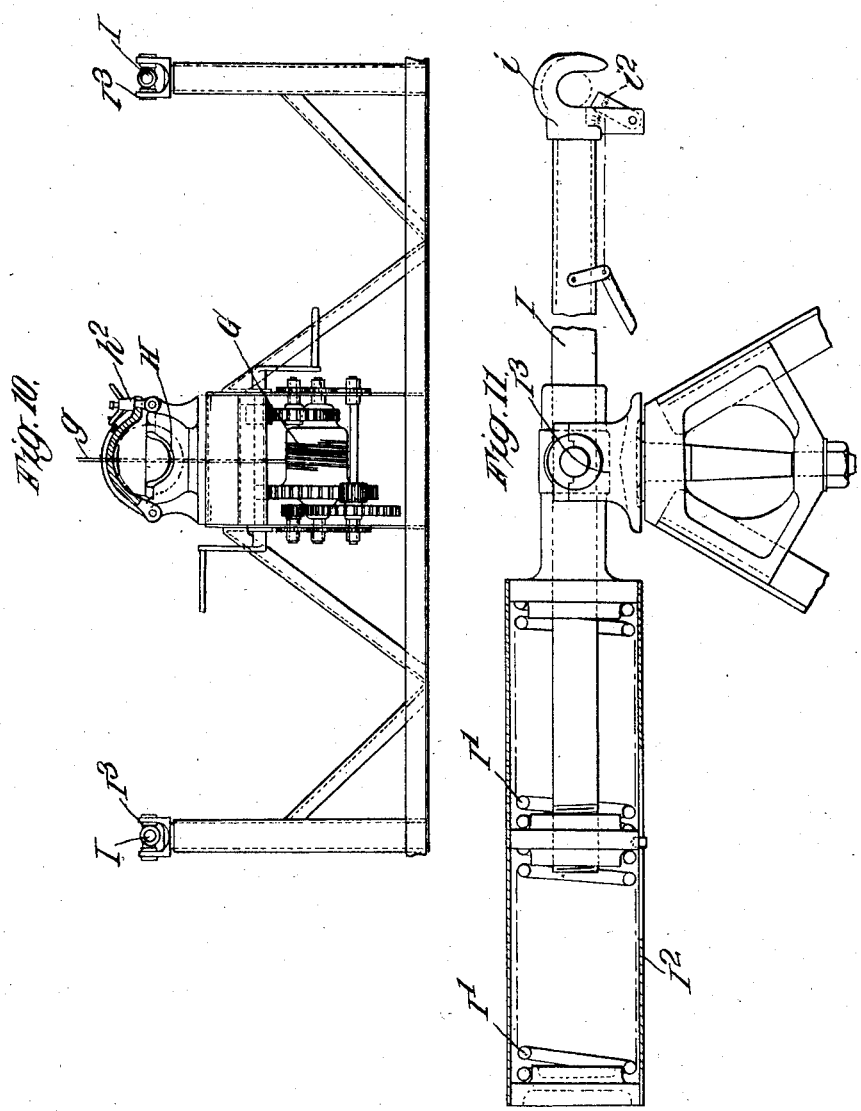

Patented July 19, 1927.

1,636,354

UNITED STATES PATENT OFFICE.

CHARLES DENNISTON BURNEY, OF WESTMINSTER, LONDON, ENGLAND, ASSIGNOR TO AIRSHIP GUARANTEE COMPANY, LIMITED, OF LONDON, ENGLAND, A BRITISH COMPANY.

MOORING MAST AND MOORING GEAR FOR LIGHTER-THAN-AIR AIRCRAFT.

Application filed February 11, 1925, Serial No. 8,400, and in Great Britain February 19, 1924.

This invention relates to mooring masts and more particularly to mooring gear for lighter-than-air aircraft, such as airships, of the kind in which, for example, a mooring fitting is provided on the nose of the airship which is adapted to be coupled to a fitting on the head of the mast, the airship being adapted to be drawn into contact with the mooring fitting on the mast head by means of a rope or cable.

In mooring gear of the aforesaid type it has been found that, if a single rope or cable is employed to draw the nose of the airship into contact with the mast head, the airship, as soon as it approaches to within a certain distance of the mast, tends to "kite" or to set up lateral hunting, or overriding forward, movements. In order to avoid such dangerous movements of the airship it has been proposed to provide, in addition to the main anchoring cable, a pair of side guy ropes or cables each of which is attached at one of its ends to the nose of the airship the other ends of the guys being anchored on the ground to leeward of the mast and respectively to port and starboard of the airship. The anchor points for the side guys have been situated on the ground at a considerable distance from the mooring mast, e. g., 500 feet, and to enable the ship to be hauled in to leeward of the mast the anchor points for the side guys have either been arranged on the ground in the form of a circle at equal distances from each other and from the mast, or else the anchor points themselves have been movable in a horizontal circle on the ground with the mast as centre. In order to carry out this method of mooring an airship an extensive area of ground is necessary (e. g., say 1000 feet square), and the chief object of the present invention is to enable an airship to be safely hauled in and anchored to the mooring mast in a restricted area which may be, for example, the deck of a vessel or the roof of a building.

Recent investigations have shown that the aforesaid lateral hunting or over-riding forward movements which arise when an airship is being towed by a single cable to a mooring mast do not arise until the airship is within about 80 feet of the mast and do not reach a dangerous magnitude until the airship is within about 40 feet of the mast so that steadying side guys can be dispensed with until the point at which the oscillations begin is reached.

According to the present invention use is made of this knowledge and, in lieu of locating anchor points for the side guys on the ground, laterally or radially projecting members or girders of a suitable length are provided at or towards the top of the mooring mast, the outer ends of said members forming, or being provided with, anchor points for the side guys or cables which steady the airship as she is being hauled down for the purpose of mooring her to the mast. The said lateral or radial members, which may be three in number and located at uniform distances apart around the top of the mooring mast so as to make obtuse angles of say 120 degrees with each other, may be about 40 feet in length, and are preferably attached to a revolving top at the head of the mooring mast or they may be attached to the mast itself, the whole structure being then rotatably mounted upon a footstep bearing at the base so that they can be brought into any desired position relatively to the approaching airship, their inner ends being also preferably spaced apart to obtain a cantilever effect. At the outer extremity of each projecting member a leading or snatch block may be provided around which the main haulage and side guy ropes or cables are passed, a haulage winch or winches being provided and suitably positioned at the top or bottom of the mast or intermediately according as the top only or the whole structure is designed to rotate for winding in the said main haulage and side guy cables. On an airship approaching the mast two of the laterally or radially projecting members are brought to leeward of the mast, by means of gear so arranged that when once the mast has been turned in the desired direction it may be locked in that position and released automatically or by hand when the ship has been secured in the mooring coupling, or when a sudden change in wind direction renders further rotation necessary to bring the lateral members once more to leeward, the remaining member projecting to windward of the mast and away from the airship. When, therefore, the main haulage cable from the nose of the airship has been brought through the snatch block at the outer end of the windwardly projecting member and when the side guys are passed through the snatch blocks on the leeward projecting members the airship, while being hauled down to the mast is steadied by the side guys in the zone where dangerous lateral hunting movements and over-riding forward movements are liable to take place. The forwardly projecting member is preferably disposed at such an angle relatively to the axis of the mast that its outer extremity is situated at a distance of about 2 feet above the mooring fitting on the top of the mast, so that the airship, when the main haulage cable has been hauled in to the proper distance to bring the mooring fitting on the ship vertically above the coupling on the mast will hover at a distance of about 3 feet above the coupling. An anchoring cable is provided which is let down from the nose of the airship when it is in, or approaches, this position, and, by means of a winch or the like on the mooring mast the mooring fitting at the airship's nose is brought into contact with the mooring fitting on the mast.

In order that the said invention may be clearly understood and readily carried into effect the same will now be described more fully with reference to the accompanying drawings which show by way of example one embodiment of the invention, and in which:—

Figure 1 is a more or less diagrammatic view showing the general arrangement of a mooring mast fitted with a revolving top which carries the main and side guy arms, the nose of an airship being shown in dotted lines in the approximate position which it occupies at the time when but for the restraining action of the side guys lateral hunting movements would begin.

Figure 2 is an elevation showing on an enlarged scale the main guy arm which projects laterally and upwardly from one side of the revolving top of the mast.

Figure 3 is a plan view of the front end of the main guy arm, and

Figure 4 is a section through the main guy arm, showing the triangular construction of the arm and its strengthening struts.

Figure 5 is an elevation on an enlarged scale of one of the two side guy arms which are positioned on the opposite sides of the mast to the main guy arm shown at Figure 2.

Figure 6 is a plan view of the front end of one of the side guy arms, and

Figure 7 is a sectional end view thereof.

Figure 8 is a sectional elevation through the revolving top, the main guy and side guy arms being omitted.

Figure 9 is a section through the inner end of one of the guy arms and part of the revolving top and shows diagrammatically one of the winches and its associated variable speed gearing by which the side guy cables are hauled in.

Figure 10 is an elevation showing on an enlarged scale the mooring cup to which the ball at the nose of the airship is secured, as also the winch and part of the auxiliary cable by which the airship, after it has been brought into position above the mooring cup, is hauled down into positon therein.

Figure 11 is a detail view showing on an enlarged scale one of a pair of radius rods which may be provided for the purpose of being coupled to lugs on the airship so as to enable the airship to turn the revolving top of the mast into any position, according to any variations in wind direction after the mooring fitting on the nose is secured to the mast, without strain or bending on the mooring fittings.

A is the mooring mast which is of built up tubular construction; B is the revolving top there and $A^1$ is a side strut. C, C are the side guy arms and D is the main cable arm. E indicates the winch and its associated variable speed gearing for hauling in the main cable $e$, and F, F, are the winches and their associated variable speed gearing for hauling in the side guy cables $f, f$. G (Figures 8 and 10) is the hand winch on the top of the mast for hauling down, by means of the cable $g$, the nose of the airship so as to position the ball at the nose thereof inside the mooring cup H after the airship has been hauled by the main and side guy cables into a position where it is located above the mooring cup H. I, I are radius rods which are slidably mounted between buffer springs $I^1$, $I^1$, the latter being located within a casing $I^2$, $I^2$ which is pivotally mounted in supports $I^3$ located on each side of the mooring cup H. The radius rods I, I are provided at their extremities with hooks $i$, $i$ having a spring controlled locking part $i^2$, $i^2$, which rods, as aforesaid, are adapted to be attached to lugs (not shown) on the nose of the ship after it has been hauled into position so as to enable the airship to be used for the purpose of turning the revolving top B without strain on the mooring fittings H and K. The revolving top B is rotatably supported on ball bearings $B^1$ on the centre fixed portion $A^2$ of the mast, said centre portion being tubular and containing an elevator $A^3$ with operating motor and gearing $A^4$. The top B is provided at its lower end with a circular angle plate $b$ which bears on rollers $a$, $a$ carried by the fixed portion $A^2$. $J^4$ is a circular rack at the upper end of the part $A^2$; $J^3$ is a pinion gearing with the rack $J^4$, the pinion $J^3$ being carried on a shaft $J^5$ on which a gear wheel $J^2$ is mounted. J is a hand lever and toothed quadrant for lifting, when desired, a pinion $J^1$ and locking it in engagement with the gear wheel $J^2$ so as to allow the top B to be turned or to be assisted in its turning movement under the influence of the airship by means of a hand wheel J¹⁰ which rotates the pinion J¹. J⁶ is a band brake for controlling the rotation of, or locking the revolving top B, the brake being adapted to be operated by a hand wheel J⁷, bevelled gearing J⁸, and right and left handed screws which carry nuts J⁹ attached respectively to each end of the band on the brake drum.

The main guy arm D as shown more clearly at Figures 2, 3 and 4 is composed of a series of upper and lower tubes D¹, D¹ and D² secured at their inner ends to the revolving tower B, a pulley or leading block D³ being provided at the outer end of the guy arm. The main haulage rope D⁴ passes round the pulley D³ to the hauling in mechanism E. On the upper members D¹, D¹ a gangway D⁶ is provided having hand rails D⁷, D⁷ to allow the operators to proceed to the end of the guy arm. The side guy arms C, C, as shown more clearly at Figures 5, 6 and 7 are of similar construction to the main guy arms shown at Figures 2, 3 and 4, each arm C being provided with a gangway and hand rail to permit the operators to obtain ready access to any part of the guy arm. C² is a step ladder provided at the inner end of each side guy arm and leading to the platform of the mooring mast. C¹, C¹ are pulley blocks at the end of each arm C over which the side guy cables $f$, $f$ are led to the hauling in mechanism F, F. L is a collapsible gangway which is normally stored as shown in dotted lines, within a compartment L¹ leading to the lift A³, but which can be extended so as to allow the passengers from the airship to pass from the nose thereof to the interior of the mast. The mooring fitting in the example shown comprises a spherical member K on the nose of the airship through which the anchoring cable $g$ passes, the fitting K being adapted to be accommodated within the spherical socket H on the mooring mast. Through the socket H the anchoring cable $g$ passes after it has been connected to the end of a cable on the hauling down winch G. The said socket is formed in two parts $h$, $h^1$ hinged together so that, when the spherical member K on the nose of the airship has been hauled by means of the cable $g$ into contact with the lower hemispherical socket on the mooring mast, the other hemispherical part $h$, hingedly attached thereto, may be closed around the spherical member K and the two parts secured together by a suitable fastening device $h^2$.

To enable the main haulage cable $g$ and the side guy cables $f$, $f$ to be brought in a ready manner round the pulley D³ and the pulleys C¹, C¹ and, if necessary by one or two operators only, the main haulage cable $e$ is carried on a storage winch in the ship and the free end of the haulage cable is led out by way of a hollow tube or the like through the sphere K. The two side guys $f$, $f$ are also carried upon storage winches in the ship and are led out laterally, preferably also through hollow tubes forming part of the supporting structure for K, which tubes are located on each side of the tube through which the main haulage cable passes. The free ends of the side guys $f$, $f$ are detachably connected to a ring which is threaded upon the main haulage cable $e$ so that the latter, as it is unwound from the storage winch, runs through the said ring, and, at a point in the length of the main haulage cable corresponding to the point at which it is desired that the side guys $f$, $f$, will commence to be unwound, a ball stopper or the like is provided which is rigidly connected to the cable, the ball being of such a diameter that it cannot pass through the aforesaid ring to which the forward ends of the side guys are attached. Consequently, and when a predetermined length of the main haulage rope has been unwound, the ball will come into contact with the ring and will pull the ring along with it and thereby unwind the side guys from the guy rope storage winches so that the ends of the side guys will be fed along with the main haulage cable to the operator at the top of the mast.

In operation, and on an airship approaching the mooring mast the side arms C, C are brought to leeward of the mast in readiness for the arm D to receive the main haulage cable $e$ and for the arms C, C to receive the side guys $f$, $f$; the ends of those portions of the cables on the main haulage winch E and the side guys winches F, F, to which the main cable and side guys from the ship are to be connected, being brought round the pulleys D³, and C¹, C¹ at the respective extremities of the arms and led to a convenient point on the mast. On the end of the main haulage cable from the ship being thrown down, an operator situated on the top of the mast connects the same to the aforesaid cable which leads round the anchor point D³ to the main haulage winch E. Alternatively, or if found desirable, the side guy cables may be led from their storage winches on the airship as above described while the mast cable for the main haulage rope may be led, or when over water may be towed, to a convenient distance from the mast head, the said distance amounting to perhaps 800 feet and is there marked or buoyed. The end of the main haulage cable from the airship which is thrown down is also marked or buoyed so that it may be readily picked up by an operator on land or in a fast boat and connected to the main haulage rope from the mast head. The main haulage rope is then hauled in until the side guy ropes are brought forward to the operator by the aforesaid ball and ring device, whereupon they are detached from the main haulage rope and connected to the cables leading round the pulleys C¹, C¹. The side guy cables f, f are, if necessary, then hauled in in the usual manner until the length thereof, between the ship's nose and the anchor points at the ends of the lewardly projecting members, is equal to the fixed distance from said anchor points to the mooring fitting at the top of the mast. The main haulage cable e is now hauled in until the mooring fitting K at the nose of the ship is located at a distance of about 3 feet above the mooring fitting at the top of the mast. The aforesaid short anchoring cable g is then let down through the spherical fitting K on the nose of the ship and is hauled in by means of the hand winch G until it is located within the mooring fitting H when it is clamped in position. If now it is desired to rotate the top of the mast the radius rods I are attached to the airship so that the ship is enabled to turn the top B into any position according to changes in wind direction.

What I claim and desire to secure by Letters Patent of the United States is:—

1. A mooring mast for lighter-than-air aircraft, in which anchor points for the side guys or cables which steady the airship as she is being hauled down to the mast are provided on laterally or radially projecting members or girders attached at or towards the top of the mooring mast.

2. A mooring mast for lighter-than-air aircraft as claimed in claim 1, which is also provided at the top thereof with one or more lateral or radially projecting members for hauling in the man haulage cables.

3. A mooring mast for lighter-than-air aircraft, comprising three laterally or radially projecting members attached at or towards the top thereof, each of said members being provided with a pulley or snatch block at or towards its outer extremity around which the main haulage cables and the side guy cables are passed.

4. A mooring mast as claimed in claim 1, in which haulage winches are provided associated with the said lateral or radially projecting members for hauling in the main haulage cables and the side guy cables.

5. A mooring mast as claimed in claim 1 in which a spherical mooring socket is provided adapted to be positioned around a spherical member on the nose of the airship.

6. A mooring mast for lighter-than-air aircraft in which anchor points for the side guys are cables which steady the airship as she is being hauled down to the mast are provided on laterally or radially projecting members or girders attached at or towards the top of the mooring mast, in which a spherical mooring socket is provided adapted to be positioned around a spherical member on the nose of the airship, and in which an auxiliary cable is provided associated with said mooring socket, said cable being adapted to be attached to the nose of the airship and to a cable carried at the nose of the airship for hauling down the spherical member into position within the mooring socket.

7. A mooring mast as claimed in claim 1 in which the laterally or radially projecting members are mounted on a revolving part located at the top of the mast.

8. A mooring mast for lighter-than-air aircraft, comprising laterally or radially projecting members of a suitable length at or towards the top of the mast, a main haulage cable and two side guy cables, carried by the airship, and pulleys or snatch blocks at the extremities of said members around which said main and side guy cables are adapted to be passed.

9. A mooring mast for lighter-than-air aircraft in which the airship is hauled down into the moored position by a main haulage cable and a pair of side guys, one portion of said main haulage cable and said side guys being carried on winches located at the nose of the airship, the free ends of the airship portions of the side guys from the winches on the airship being connected to a ring or like member through which the airship portion of the main haulage cable can pass freely, the airship portion of the main haulage cable being provided with a ball or other stop device which cannot pass through said ring and which is located at a suitable distance from the free end thereof, so that when a predetermined length of the airship portion of the main haulage cable has been unwound the ball or stop device will come into contact with the ring or like member and will pull the ring along with it and thereby unwind the airship portions of the side guys from the guy rope storage winches on the airship the ends of said airship portions of the side guys being thus led along with the airship portion of the main haulage cable to an operator on the mast and connected to mast portions of the main haulage and side guy winches.

CHARLES DENNISTON BURNEY.